April 18, 1950     J. L. MARIANI     2,504,339
NOODLE MACHINE

Filed Nov. 18, 1943     5 Sheets-Sheet 1

INVENTOR
JOHN L. MARIANI
BY
ATTORNEY

April 18, 1950     J. L. MARIANI     2,504,339
NOODLE MACHINE
Filed Nov. 18, 1943     5 Sheets-Sheet 2
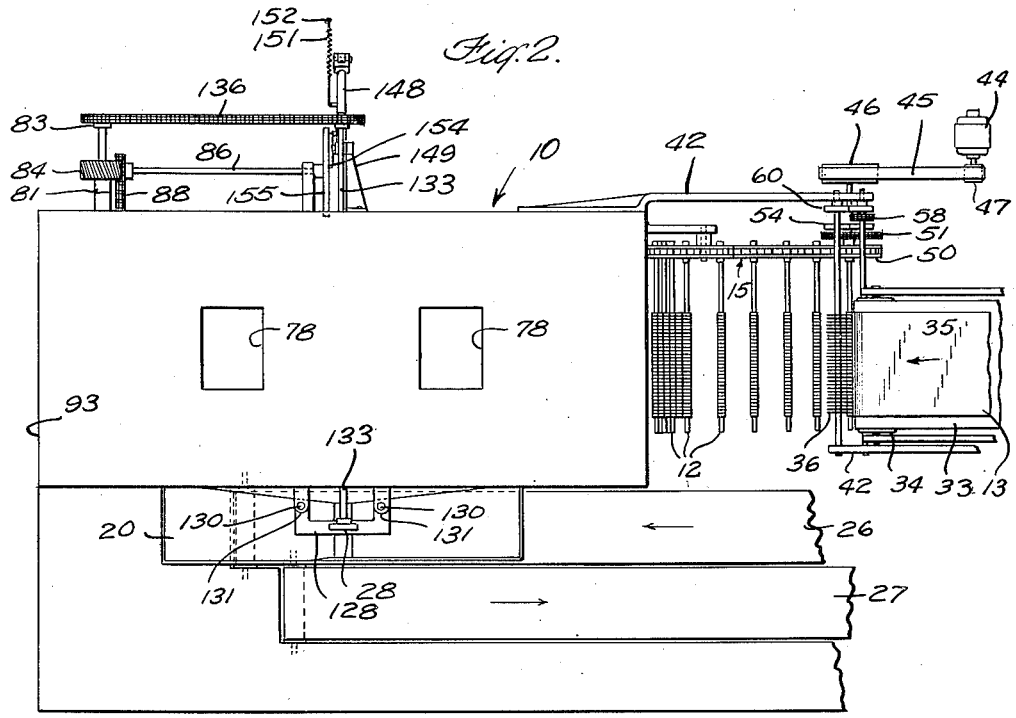
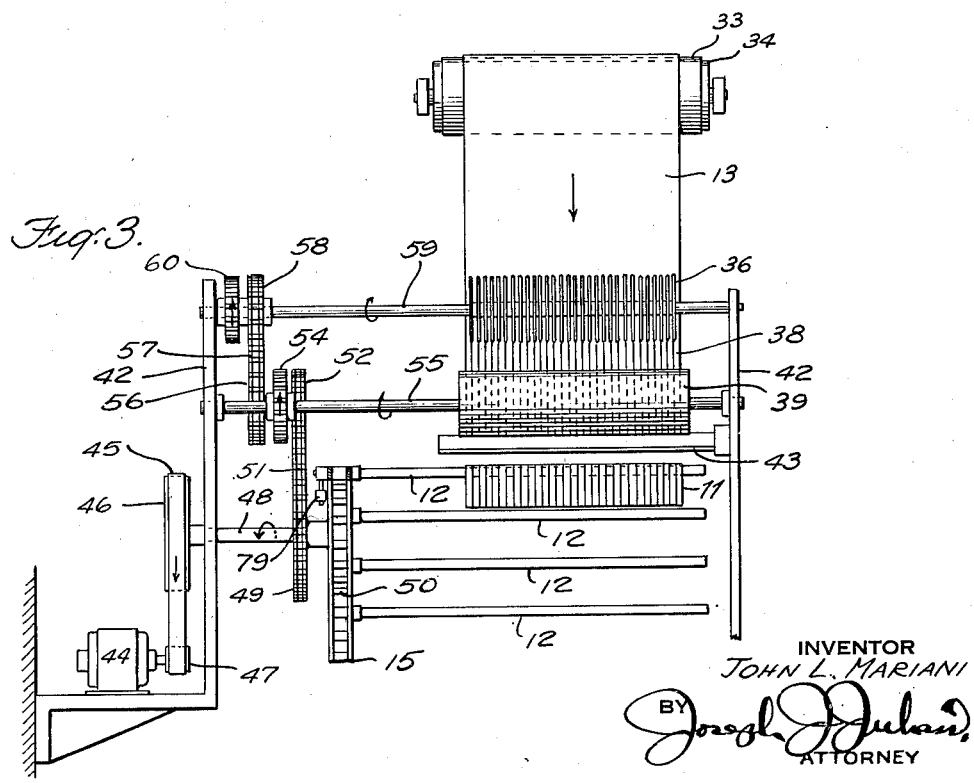
INVENTOR
JOHN L. MARIANI
BY
ATTORNEY April 18, 1950   J. L. MARIANI   2,504,339
NOODLE MACHINE Filed Nov. 18, 1943   5 Sheets-Sheet 3

INVENTOR
JOHN L. MARIANI
BY Joseph J. Julian
ATTORNEY

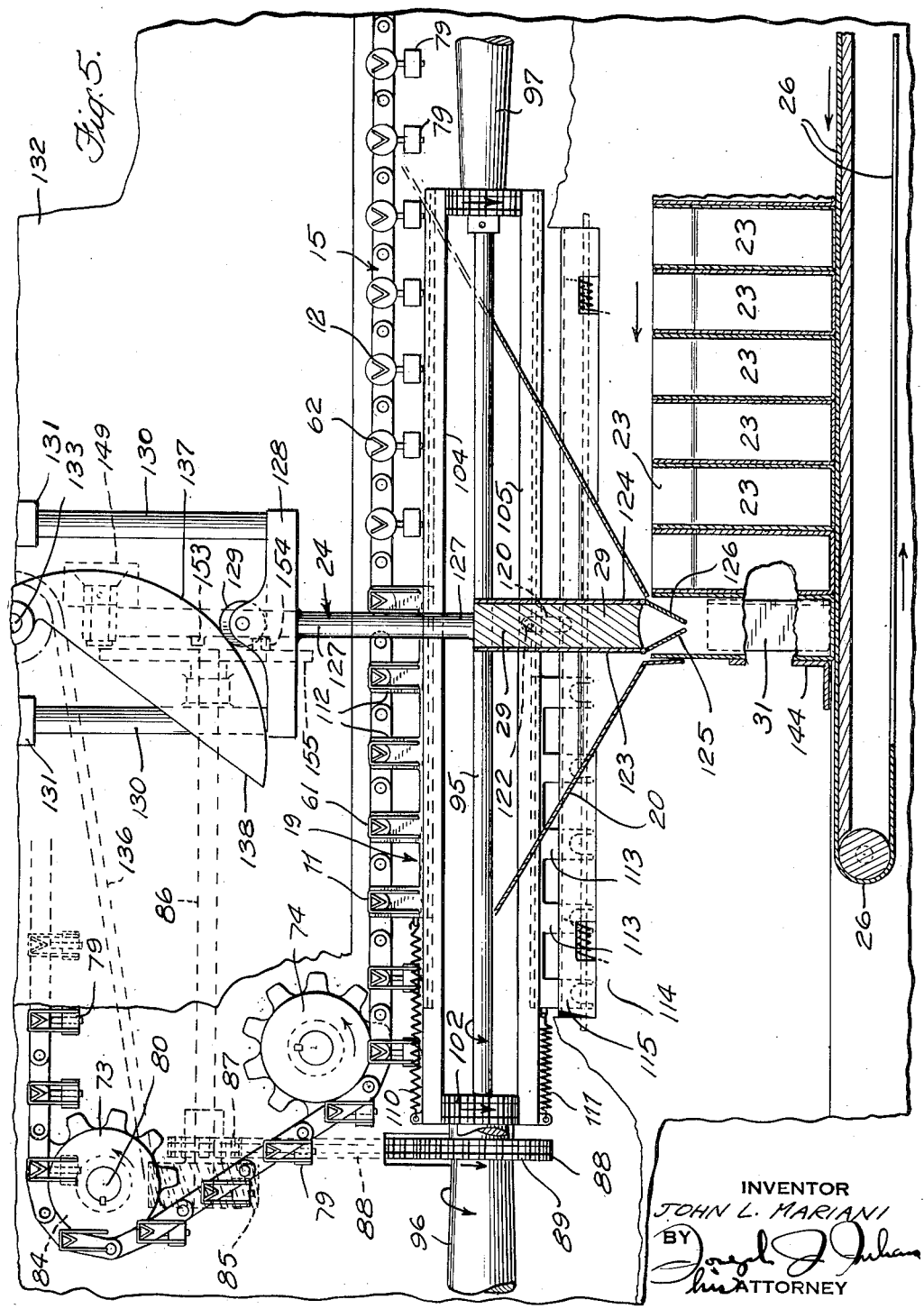

April 18, 1950
J. L. MARIANI
2,504,339
NOODLE MACHINE
Filed Nov. 18, 1943
5 Sheets-Sheet 5
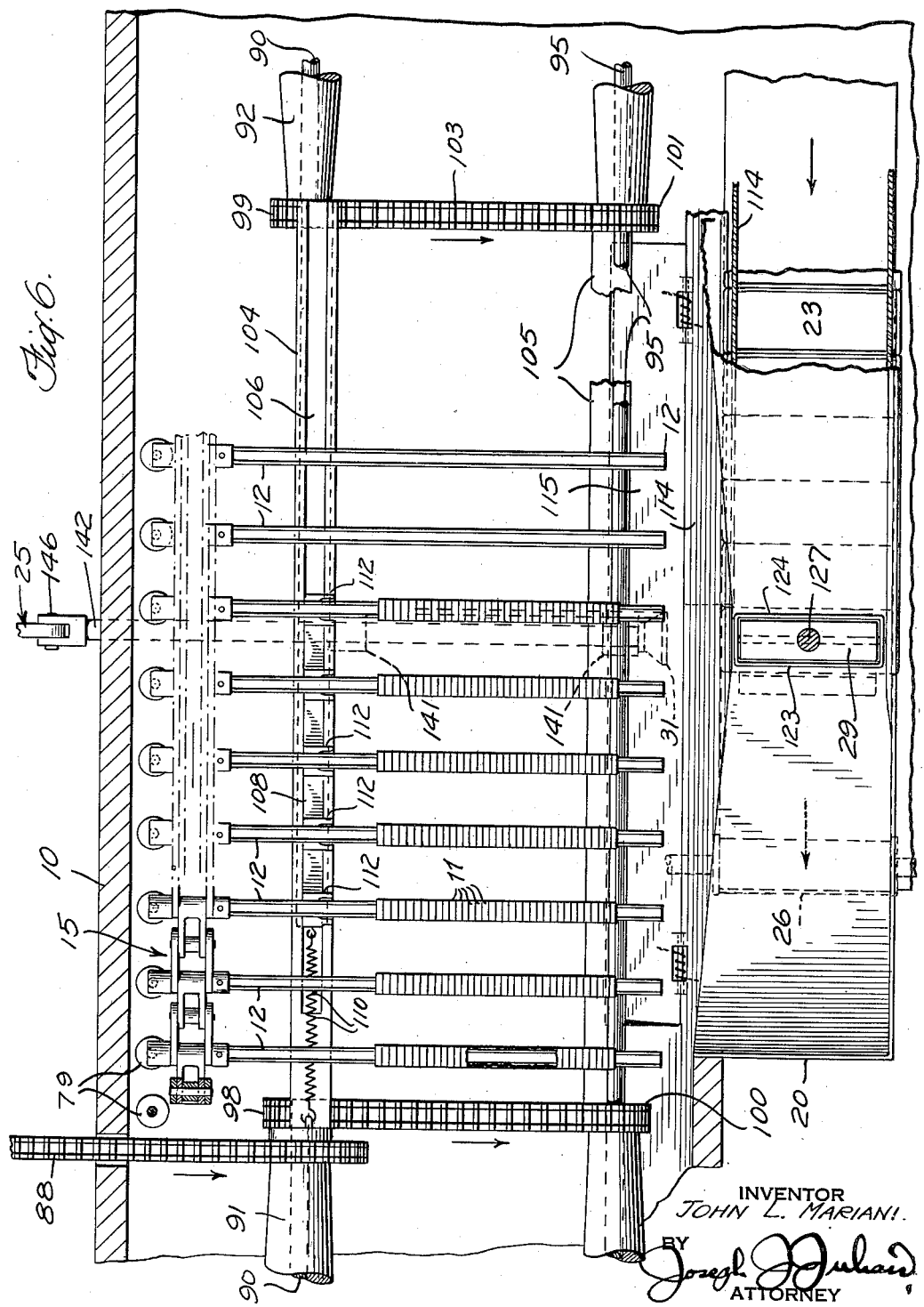
INVENTOR
JOHN L. MARIANI.
BY
ATTORNEY Patented Apr. 18, 1950

2,504,339

UNITED STATES PATENT OFFICE 2,504,339

NOODLE MACHINE

John L. Mariani, New York, N. Y.

Application November 18, 1943, Serial No. 510,743

2 Claims. (Cl. 107—7)

This invention relates generally to the manufacture of noodles and more particularly to a novel and useful machine for producing, in a continuous manner, relatively large quantities of noodles at low unit manufacturing cost.

It is known in the noodle making art to produce separate noodles in large quantities from a dough mass and to dry the so-called "wet" noodles by a continuous conveyor method. In accordance with prior art devices and methods, the noodles are passed through the drying chamber in a hit or miss fashion, with the result that the noodles become variously deformed. This lack of uniform shape and size of the individual noodles not only increases the difficulty with which they are packed, usually by placing them in rectangular cartons, but also increases the likelihood of breakage of the dry noodles which, in that state, are, of course, relatively brittle. In accordance with prior art construction and method, also, the individual noodles are tossed and turned as they are conveyed through the drying chamber and this results in a certain amount of abrasion of the noodles, causing an accumulation of fine debris in the chamber which must be removed. In this step of drying it is, of course, desirable that a maximum amount of surface be exposed to the action of the drying medium, usually super-heated air and to that purpose, the individual noodles are changed in position. In accordance with the present invention the noodles, once they have been removed from the noodle making mechanism, are supported in a single relative position with a maximum amount of the surface of the noodle exposed to the action of the drying medium.

It is therefore among the principal objects of the present invention to provide a novel and useful noodle making machine wherein a dough mass or strip of dough is furnished to the machine at the beginning of the operation and completely formed and fully dried individual noodles of uniform shape and size are placed in a carton therefor and dispensed by the machine at the end of the operation.

Another object herein lies in the provision of a machine and method of the class described wherein the operation is continuous and substantially automatic.

The important feature of the present invention lies in the fact that the noodles, during any stage of the processing thereof, need not be touched by human hands so that the noodles, as fabricated, are completely sanitary.

Another object herein lies in the provision of means whereby the individual noodles, in plural correlated arrangement, are automatically deposited upon noodle carriers, which carriers are consecutively moved through the drying chamber.

Another object herein lies in the provision of a noodle conveying structure whereby the noodles are carried through the machine up to the point of discharge without a change in position thereof, with relation to themselves. This last mentioned carriage of the noodles is accomplished even though the general path of movement of the noodles through the machine is bent upon itself many times to create a maximum drying effect within the drying chamber.

Another object herein lies in the provision of means for the transportation to the machine of a series of unfilled cartons and the transportation from the machine of a series of filled cartons.

Another object herein lies in the provision of noodle packing mechanism which automatically removes the noodles from the carriers therefor and deposits them in a hopper.

Another object herein lies in the provision of mechanism for removing a pre-determined amount of noodles from the hopper and placing this amount within a carton therefor.

Another object herein lies in the provision of means for the transfer of filled cartons from the empty carton supplying conveyor to the filled carton removing conveyor.

Another object herein lies in the provision of correlating means whereby all of the separate but dependent functions of the machine and steps of the method may be accomplished in an automatic manner.

Another object herein lies in the provision of a machine of the class described in which the available space is used efficiently so that a maximum amount of finished noodles may be turned out by machinery occupying a minimum of space.

These objects and other incidental things and advantages will more fully appear in the progress of this disclosure.

In the drawings in which similar reference characters designate corresponding parts throughout the several views:

Figure 1 is a front elevational view of a noodle making machine showing a preferred embodiment of the invention. In this figure certain of the parts are broken away and shown in partial section. Other parts are fragmented.

Figure 2 is a top plan view of Figure 1.

Figure 3 is a fragmentary vertical sectional view as seen from the plane 3—3 on Figure 1.

Figure 5 is a fragmentary vertical sectional view, partly an elevation, as seen from the plane 5—5 on Figure 4.

Figure 6 is an enlarged fragmentary horizontal sectional view as seen from the plane 6—6 on Figure 4.

Figure 1:
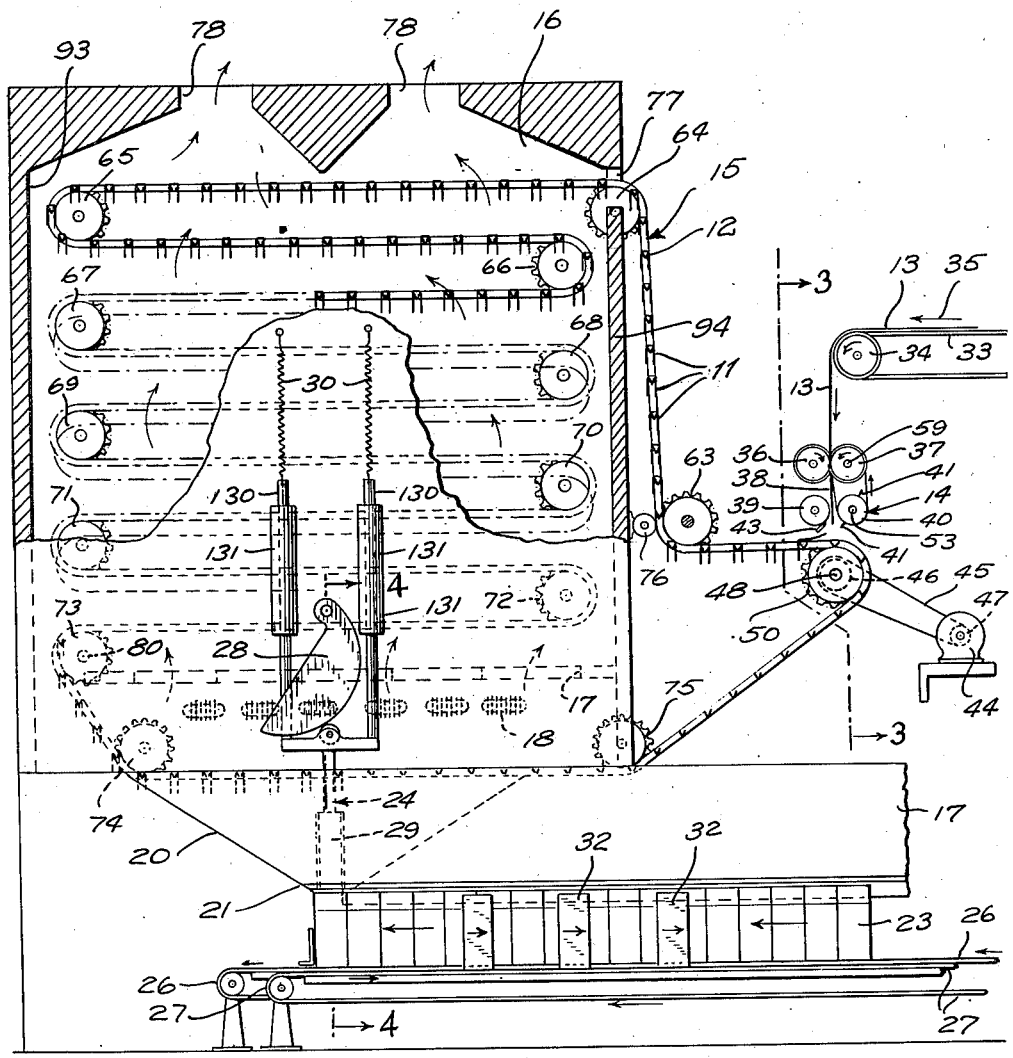

In accordance with the invention the noodles, generally indicated by numeral 11, enter the machine in the form of a strip of noodle dough 13, are severed into individual noodles by the noodle making mechanism 14. From the noodle making mechanism 14 they are automatically deposited upon the noodle carriers, generally indicated by numeral 12, which are in turn part of and moved by the main noodle conveyor 15. The noodle conveyor 15 enters a drying chamber 16 where it follows a circuitous path and wherein the noodles 11 are acted upon by the drying medium which may be a heated current of air supplied through the air supplying conduit 17 and heated in any suitable manner as, for example, by the steam radiators 18. The noodles on the lowermost traverse of the conveyor 15 are removed therefrom by the noodle removing mechanism 19 and dropped into the hopper 20. The noodles slide or fall to the spout or mouth 21 of the hopper and are then in a pile or group so that they may be pushed through the hopper mouth into one of the empty cartons generally indicated by numeral 23 by the box or carton loading mechanism generally indicated by reference character 24. After the particular carton 23, disposed below the spout 21, has been filled, the carton transfer mechanism, generally indicated by numeral 25, is actuated in timed sequence to push the loaded carton off of the empty carton supplying conveyor 26 to the full carton removing conveyor 27.

In the procedure just described, all of the various mechanisms are inter-related and timed so that the proper sequence of operations is obtained. The size of the empty cartons 23 is preferably such that they are adapted to receive the amount of noodles in a dried state which has been deposited upon and carried by five of the carriers 12. The sequence of operations is such that after the noodles carried by a particular given set of five carriers have been removed therefrom by the noodle removing mechanism 19 and these noodles have fallen to the bottom of the hopper 20 adjacent to the mouth 21, the cam 28 of the carton loading mechanism 24 drives the plunger 29 downwardly so that said plunger pushes said noodles through the spout 21 into the carton 23 therebelow. Some of the noodles will fall into the empty container therebelow but the plunger 29 assists the action of gravity and forces a sufficient quantity into the container to properly fill the same. The straight face of the cam 28 allows the springs or other resilient means 30 to quickly retract the plunger 29 to the uppermost position thereof. Immediately following the said retraction of the plunger 29 the pusher 31 of the carton transfer mechanism 25 is advanced or shifted to the right, as viewed in Figure 4 (forwardly of the machine 10 proper) and this shift causes the last filled carton to be transported to the full carton removing conveyor which carries the filled carton in the direction of the movement of the filled cartons generally indicated by numeral 32.

Immediately following the transfer of a filled carton from the conveyor 26 to the conveyor 27, another unfilled carton 23 will be moved up into position below the spout or mouth 21 in time to receive the next batch of noodles as they are removed from the next group of five noodle carriers.

As seen in Figure 1, the strip of noodle dough may be in the form of a relatively wide band and may be supplied to the conveyor 33 by any noodle dough preparing machine well known in the art to which the present invention relates and therefore not particularly illustrated in the drawings. The dough 13 as ejected by such machine, is in the form of a flat wide band and is easily transported by the conveyor 33 which may take the form of a flat belt supported at one end thereof by a roller or drum 34. The noodle dough strip 13, travelling in the direction of the arrow 35, passes about an end of the conveyor and drops vertically to pass between the longitudinal severing rollers 36 and 37, which are arranged in a cooperating pair to cut the relatively wide band of noodle dough 13 into a series of parallel ribbons. These ribbons are relatively narrow as compared with the strip 13 and are indicated by numeral 38. The ribbons 38 pass between a pair of cooperating rollers 39 and 40. The roller 40 carries a pair of opposite and radially disposed cutting blades 41, which sever the ribbons 38 into individual lengths to form the individual noodles 11. The roller 39 thus acts as a surface against which the blades 41 may act to transversely sever the ribbons of noodle dough. A stripper 43 assists in removing the severed noodles from the surface of the roller 39.

As may be seen in Figures 1, 2 and 3, the noodle making mechanism 14 may be suitably supported by a frame work 42. In order to assure the proper synchronization between the various moving parts, they are preferably driven from a single motive source as, for example, the electric motor 44. Suitable speed reducing mechanism may be employed, such as the belt 45 and the sheaves 46 and 47. The sheave 46 is fixedly secured to the rear end of shaft 48 suitably journalled in the frame work 42, and the shaft 48 carries a sprocket 49 and a sprocket 50. The sprocket 49 is connected by a chain 51 to a sprocket 52, which drives the shaft 53. The shaft 53 is provided with a gear meshing with the gear 54 in a one to one ratio and the gear 54 is secured to the shaft 55. The shaft 55 has secured thereto the roller 39. Shaft 53 has secured thereto a sprocket 56 which is connected by a chain 57 to a sprocket 58. The sprocket 58 is secured to a shaft 59 which carries the roller 37 and also a gear which meshes with the gear 60 in a one to one ratio.

It may thus be seen that since all of the mechanism just described is directly inter-connected, proper timing will be obtained and the noodle making mechanism 14 is in turn synchronized with the main noodle conveyor 15 since this last mentioned conveyor is driven by the sprocket 50 on the shaft 48. The conveyor 15 may take the form of an annular chain having laterally and horizontally projecting therefrom the noodle carriers 12. All of these carriers are substantially identical and are preferably V-shaped in cross section so that a noodle 11 will be supported at only two very narrow points, such as the points 62 (see Figure 5). This V shape in cross section configuration of the noodle carries 12 possesses the advantages of stiffness and light weight and also forms a passage 61 which may be entered by the heated air in the drying chamber 16. Conveyor 15 is supported in operative position by a plurality of idler sprockets 63—75, inclusive. The sprocket 63 has associated therewith a guide roller 76 secured to the right hand outer surface of the chamber 16. The idler sprocket 64 is suitably journalled within an opening 77 in the upper portion of the chamber 16 while the sprocket 75 is located in the lower portion of the chamber 16 within another suitably disposed orifice. The position of the idler sprocket 75 is such as to have the lowermost or discharging traverse of the conveyor 15 level and at the lowermost portion of the chamber 16 above the hopper 20. The movement of the conveyor 15 is substantially continuous and its speed of travel and length are correlated with the temperature, relative humidity and volume of the drying medium which passes upwardly through the chamber 16 and out of the flues 78. As is well known in the art to which the present invention relates, the temperature of the radiators 18 may be controlled thermostatically so that the desired temperature of the drying medium is maintained at a substantially constant level. By introducing the wet noodles into the upper portion of the chamber 16, these wet noodles are subjected to the action of the most humid drying medium so that the drying of the noodles takes place gradually throughout their entire mass. The noodles, as they approach the lowermost traverses of the conveyor 15, are almost completely dry and they are exposed to the driest portions of the drying medium.

The drying chamber 16 may be constructed in any suitable manner and need be of a size sufficient only to encompass the traverses of the conveyor 15 therewithin. All of the moving parts supported by bearings within the drying chamber 16 are preferably mounted so that movement of said parts may be made in a satisfactory manner at the elevated temperatures obtaining therein.

Figure 4:
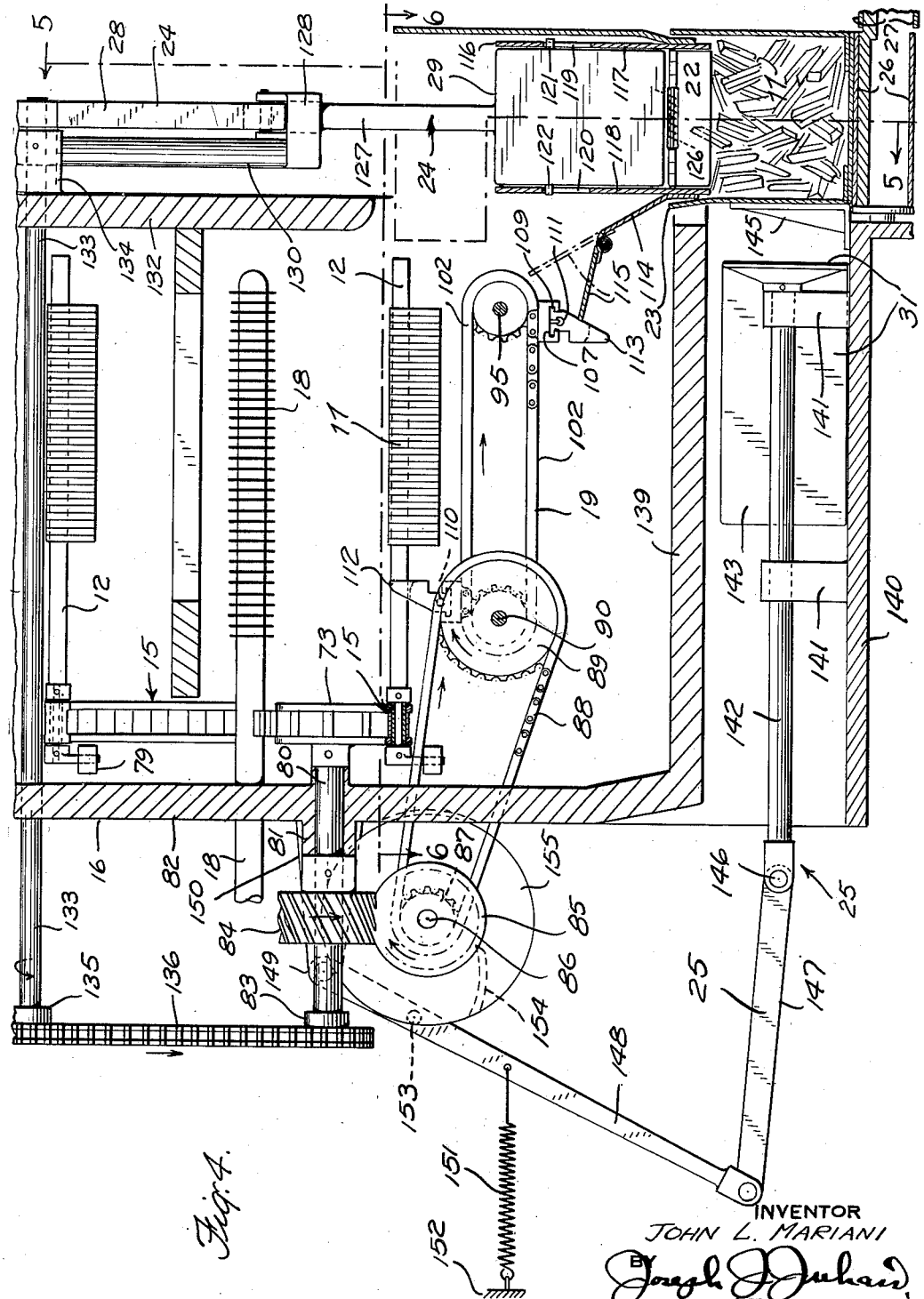
Figure 4 is an enlarged fragmentary vertical sectional view as seen from the plane 4—4 on Figure 1.

As best seen in Figure 4, it will be noted that the noodles on any one of the individual carriers 12, as well as the weight of the carrier itself, will tend to cause a torsion in the conveyor 15 since the load is eccentrically disposed. A balanced condition is obtained by disposing counterweights 79 on the opposite ends of the carriers 12. The carriers 12 are each rotatively mounted in the conveyor 15 and it will be noted that the counterweights 79 are radially offset with relation to the axis of rotation of the carriers 12. This construction, by the action of gravity upon the counterweights 79, maintains the carriers 12 in a constant position with relation to themselves so that the points of support 62 are always maintained uppermost and the noodles 11, as they go through the machine, have an inverted U shape.

The idler sprocket 73 is only an idler in that it positions the conveyor 15 at that location. It is, however, keyed to a shaft 80 which acts as a power take-off for the noodle removing mechanism 19, the box or carton loading mechanism 24, and the carton transfer mechanism 25. The shaft 80 is suitably journalled in a bearing 81 disposed in the lower portion of the rear wall 82 of the drying chamber 16 (Figure 4) and has affixed thereon a sprocket 83 and a helical gear 84. The helical gear 84 meshes with a complementary gear 85 which is fixedly mounted upon a shaft 86. The shaft 86 is suitably trunioned upon supports which are not shown for the purpose of clarity in the drawings, so that said shaft 86 lies below and at right angles to the shaft 80. The shaft 86 has fixedly mounted thereon a sprocket 87, which is connected by means of a drive chain 88 to the sprocket 89 fixedly mounted upon the shaft 90.

The shaft 90 is generally horizontally disposed and is journalled in bearings 91 and 92 (see Figure 6), which extends inwardly from the downward extensions of the side walls 93 and 94. Spaced and parallel to the shaft 90 is another shaft 95 which is suitably journalled in the bearings 96 and 97, which are mounted similarly to the bearings 91 and 92. The shaft 90 is provided with a pair of sprockets 98 and 99, which are connected to the sprockets 100 and 101, respectively, by means of the chains 102 and 103. Since the sprockets 98 and 99 are keyed to the shaft 90 they, in turn, drive the sprockets 100 and 101, and the latter are, in turn, keyed to the shaft 95. The chains 102 and 103 are interconnected by tie-bars. The tie-bars 104 and 105 are provided with elongated guideways 106 and 107 within which the plates 108 and 109 are slideably mounted. As best seen in Figure 6, the plates are resiliently urged toward the leftmost portion of the machine 10 by the springs 110 and 111. The right hand ends of the springs are connected to the left hand ends of the plates, while the left hand ends of the springs are connected to the left hand ends of the tie-bars 104 and 105, respectively. Secured to and upwardly extending (in the active position thereof) from the plates 108 and 109, are the noodle removing fingers 112 and 113. As shown in the drawings, the noodle removing fingers 112 comprise a set of five and the noodle removing fingers 113 comprise a corresponding set of five. In the embodiment illustrated five fingers are disposed in each set because it is desired to remove the dried noodles from a set of five carriers at a given discharge operation. Obviously, where desired a greater or lesser number of fingers may be included in a given set so as to clear a greater or lesser number of carriers in a given discharging sequence.

By virtue of the noodle removing mechanism 19 just described, the sets of fingers 112 and 113 alternate in active position and in moving in the direction of the arrows on Figure 4 they carry the dried noodles 11 to the right, where they fall upon a deflector 114. The deflector 114 includes an upper portion 115 in the form of a hingedly and resiliently mounted plate. The normal position of the plate 115 is shown in Figure 4 by dot dash lines. The plate 115 is shown in the deflected position thereof in full lines on said figure. Deflection of the plate 115 is caused by the engagement therewith of the fingers 112 or 113. The noodles 11, after being removed from the carriers by a given set of fingers, fall into hopper 20 and fall further by gravity into the lowermost portion or spout 21 thereof.

Since the operation of the conveyor 15 is substantially continuous, the operation of the fingers 112 and 113 is synchronized by the drives previously described so that one set of fingers at a time will engage with a set of five of the carriers 12 and those engaged fingers will be carried laterally of the machine 10 along with the movement of the particular carriers or to the right, as viewed in Figure 6. In this movement of the fingers, the plates 108 and 109 are likewise carried to the right against the tension of the springs 110 and 111. As soon as the fingers have moved toward the front of the machine sufficiently to pass about the axle 95, they drop down and forwardly out of engagement with the carriers 12 and are then pulled back to the original position thereof, which is to the left of the travel permitted the plates 108 and 109, within the guideways 106 and 107, respectively. The upper terminals of the fingers 112 and 113 have a configuration sufficient to engage the noodles to remove them from the carriers therefor.

A considerable portion of the noodles which are ejected from the particular set of carriers and deposited within the hopper will fall upon the empty carton 23 disposed below the mouth 21 of said hopper. Since the noodles within the hopper are arranged in irregular or non-symmetrical fashion, it is desirable to positively push those which do not fall into the particular container of their own accord. Thus the box or carton loading mechanism 24 assists the action of gravity and includes the plunger 29 which is vertically reciprocated in timed correlation to the other moving parts of the machine. The plunger 29 has a casing 116 therefor, which engages the outer vertical surface of said plunger. The outer surfaces of the casing 116 are of such size and configuration that they may enter between the vertical walls of the empty container 23, disposed below the spout 21, at a given time. In Figure 4 the front and rear walls of the casing 116 are seen and in Figure 5 the side walls of said casing are seen. The front and rear walls 117 and 118, respectively, are provided with vertically disposed slots 119 and 120 within which are slidably positioned the pins 121 and 122, which project from the forward and rear surfaces, respectively, of the generally rectangular shaped plunger 29. This permits the casing 116 to be dropped by the action of gravity to the position it occupies on Figure 4 with respect to the plunger 29 and permits the casing 116 to be elevated by pushing thereagainst by the upper surfaces of the noodles 11 disposed within the carton 23. Hingedly mounted to the lowermost edges of the side walls 123 and 124 of the casing 116 are the packing plates 125 and 126. These plates are resiliently urged in the lower position thereof shown in the full lines on Figure 5 by coil springs associated with the hinges which serve to connect said packing plates to the lower edges of the said walls 123 and 124. The resilient movability of these plates allows the casing 116 to make a yielding contact with the noodles in the container so that when the plunger 29 is moved to its lowermost position during the loading operation, the noodles within the container are not directly acted upon, with a consequent reduction in crushing or crumbling of the noodles which are relatively brittle at this stage. The plunger 29 has a central vertical connecting rod 127 extending upwardly therefrom and the upper end of said connecting rod is secured to a crosshead 128. The crosshead 128 is provided with a trunnioned roller follower 129 and with upstanding slide rods 130, which are suitably slideably mounted in the bearings 131. The bearings 131 are suitably connected to the forward surface of the front wall 132 of the drying chamber 16. The plunger 29 is resiliently urged into the elevated or pre-loading position thereof by the contractile springs or resilient means 30. The follower 129 is acted upon by the cam 28 of peculiar configuration best seen in the drawings and said cam is keyed to the forward end of a shaft 133 (Figure 4). Said shaft is journalled in the bearing 134 and the front and rear walls 132 and 82, respectively. Affixed to the rear end of the shaft 133 is a sprocket 135 which is connected by a chain 136 to the sprocket 83. Thus the vertical reciprocation of the plunger 29 is correlated to the movement of the conveyor 15 since the sprocket 83 is driven by the shaft 80 which in turn receives its motion from the sprocket 73.

The cam 28 has a plunger lowering edge 137 which quickly pushes the plunger down during only a portion of the cycle of revolution of the shaft 133. The plunger return edge 138 permits an almost instantaneous return. Thus the action of the plunger 29 is to suddenly push the noodles which have not fallen into the carton therein and to quickly come back away from the carton so that said plunger or the casing there around do not interfere with the carton transfer mechanism 25, about to be described.

Disposed below the bottom wall 139 of the drying chamber 16 is a support platform 140 provided with a pair of upstanding bearings 141 within which is slideably disposed a push rod 142. The forward end of the push rod has affixed thereto the pusher 31 which is shown in the inactive position thereof in full lines in Figure 4. The pusher 31 has connected and rearwardly extending from the right edge thereof a stop plate 143. The pusher 31, together with the stop plate 143, is horizontally oscillated forwardly and rearwardly of the machine 10 to push a filled container 23 from a position below the spout 21 off of the empty carton supplying conveyor 26 forwardly onto the full carton removing conveyor 27. The carton disposed below the spout 21 is properly positioned by a stop member 144 and is guided at the rear surface thereof by the guide 145.

The rear end of the push rod 142 has a clevis connection 146 to a link 147 and the rear end of said link is pivotally connected to the lower end of a lever 148, the upper end of said lever being pivotally connected at 149 to a support 150 extending rearwardly off the wall 82. The lever 148 is normally resiliently urged in a rearward direction by the contractile spring or resilient means 151. The forward end of said spring 151 is connected to the lever 148 and the rear end of said spring is suitably connected to a support 152, which is fixed in position in any suitable manner with respect to the machine 10 or a frame member thereof. The upper portion of the lever 148 is provided with a follower 153 which is adapted to be acted upon by a cam surface 154 secured to the circular plate 155. The plate 155 is keyed to the shaft 86. Thus when the plate 155 and the cam surface 154 revolve in a clockwise direction, as viewed in Figure 4, periodically the mechanism just described will cause the pusher 131 to be oscillated forwardly of the machine to push a filled carton from the conveyor 26 to the conveyor 27. Upon disengagement of the surface 154 with the follower 153 the spring 151 acts to retract said pusher 31 to the inactive position thereof.

The operation of the entire machine and particularly the synchronization thereof will be understood when it is seen that substantially all of the interrelated drives are of one to one ratio with the exception of the drive obtained by the chain 88, the last mentioned drive being a two to one step-up because of the double sets of fingers 112 and 113.

It may thus be seen that I have disclosed a novel and useful noodle making machine which is capable of continuous noodle production on a relatively large scale with reduced cost of production. All of the operations are substantially automatic so that a minimum of operator supervision is required.

I wish it to be understood that I do not desire to be restricted to the exact details shown and described because obvious modifications will occur to a person skilled in the art to which the present invention relates.

I claim:

1. In a noodle making machine, a conveyor consisting of a chain having channeled elements free at one end and adapted to support noodle strips for passage through a drying zone and to a hopper, and mechanism consisting of fingers movable longitudinally of the channelled elements and operative to slide the noodle strips longitudinally of said channeled elements and off the free end of the same for discharge into the hopper.

2. Means as defined in claim 1 wherein said noodle sliding mechanism comprises fingers straddling the channeled elements and movable in a direction transverse to the direction of movement of the conveyor and adapted to engage the noodle strips to slidably eject the latter from the supports.

JOHN L. MARIANI.

REFERENCES CITED

The following references are of record in the file of this patent:

UNITED STATES PATENTS

| Number | Name | Date |
|---|---|---|
| 564,287 | Knodenberg et al. | July 21, 1896 |
| 1,090,509 | Wild | Mar. 17, 1914 |
| 1,099,114 | Bracy | June 2, 1914 |
| 1,192,336 | Mueller | July 25, 1916 |
| 1,304,104 | Schiller | May 20, 1919 |
| 1,707,088 | Lynch | Mar. 26, 1929 |
| 1,967,213 | Beplate | July 24, 1934 |
| 1,985,574 | Mariani | Dec. 25, 1934 |
| 2,037,724 | Jacobs et al. | Apr. 21, 1936 |
| 2,100,821 | Sim | Nov. 30, 1937 |
| 2,175,560 | Friden | Oct. 10, 1939 |
| 2,336,415 | Nordquist et al. | Dec. 7, 1943 |

FOREIGN PATENTS

| Number | Country | Date |
|---|---|---|
| 53,059 | Austria | Apr. 10, 1912 |